Sept. 12, 1944.  M. H. SULLIVAN  2,357,854
PISTON
Filed March 24, 1943
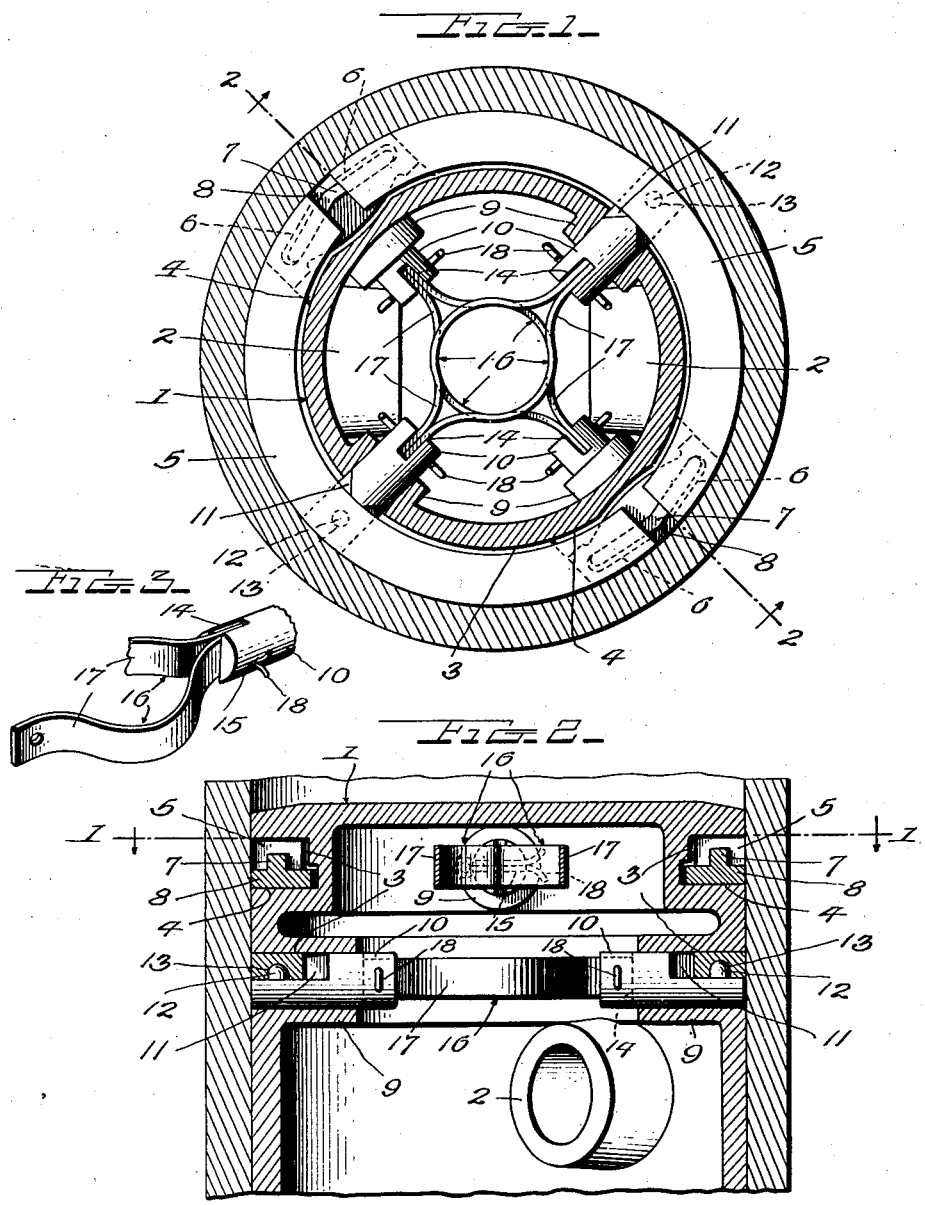
Michael H. Sullivan, Deceased,
Inventor.
by Susan V. Sullivan, Administratrix.
By H. B. Willson & Co.
Attorney Patented Sept. 12, 1944

2,357,854

UNITED STATES PATENT OFFICE 2,357,854

PISTON

Michael H. Sullivan, deceased, late of Poughkeepsie, N. Y., by Susan V. Sullivan, administratrix, Poughkeepsie, N. Y.

Application March 24, 1943, Serial No. 480,366

3 Claims. (Cl. 309—29)

The invention relates to pistons of the hollow type which have sectional piston or packing rings held in tight contact with the cylinder wall by means of springs, and it consists in improvements in the piston of the Michael H. Sullivan Patent No. 1,574,135, dated February 23, 1926.

In that patent the die-cast piston was formed on its inner wall with diametrically opposed hollow bosses to receive plungers for actuating the ring sections outward against the cylinder wall and the diametrically opposed plungers were actuated by a single wire spring connected at its ends to the ends of the plungers, the spring being bowed or substantially U-shaped to follow to a great extent the inner wall of the piston. It has been found that the use of such single wire springs permits sagging or canting of the plungers, especially where there is any looseness of the plungers in their bosses due to wear or other causes. That sagging or canting of the plungers increased the wear on them and their bosses and resulted in improper pressure of the ring sections on the cylinder wall. Further, the use of the single springs also prevented the equal distribution of weight around the piston.

The object of the present invention is to overcome these and other defects of the structure of said patent and to obtain a more positive and balanced pressure of the ring sections on the wall of the cylinder and a more perfectly balanced piston. Instead of using a single wire spring between diametrically opposed plungers, a double flat or band type spring is employed. The advantages of the new construction will be pointed out hereinafter.

In the accompanying drawing,

Figure 1 is a horizontal sectional view of the improved piston taken substantially on the plane indicated by the line 1—1 of Fig. 2.

Fig. 2 is a vertical or longitudinal sectional view taken substantially on the line 2—2 of Fig. 1.

Fig. 3 is a detail perspective view of the inner end of one of the plungers with a pair of springs connected thereto, one of the springs being broken off.

In the illustrated embodiment of the invention, the numeral 1 designates a hollow piston having the usual wrist pin bearings 2 and a suitable number of piston ring grooves 3. Each of the grooves has one of its side walls recessed as at 4, the recesses being located at diametrically opposite points of each groove. Two longitudinally spaced grooves 3 are preferably employed and the recesses 4 of one groove are located at right angles to the recesses of the other groove.

Sectional piston rings are positioned in grooves 3 and each is formed of two complementary halves 5 whose ends substantially meet at the recesses 4. The adjacent ends of the semi-circular ring sections 5 are formed in one flat side with straight outwardly converging grooves 6 to receive outwardly converging ribs 7 formed on sealing blocks 8. These blocks are disposed in the recesses 4 and contact with the ring sections 5.

The piston is also formed with short inwardly extending hollow bosses 9 disposed opposite the grooves 3, two being provided for each groove. The bosses for each groove are positioned at diametrically opposite points and the bosses for one groove are disposed at right angles to the bosses of the other groove. The bosses 9 are also positioned so that a pair of them are on each side of a vertical or longitudinal plane passing through the axis of the alined trunnions or bearings 2 for the connecting rod pin, with all of the bosses equally distant from said plane, as will be seen on reference to Fig. 1.

Disposed in the bosses 9 are plungers 10, the outer ends of which are cut away on one side as at 11 and are provided with projections 12 fitting in recesses 13 formed in the ring sections 5 as shown in Fig. 2. The plungers are thus connected to the centers of the semi-circular ring sections. The inner cylindrical ends of the plungers 10 project beyond the inner ends of the bosses 9 and have formed in their flat extremities diametrically and longitudinally extending slits or notches 14 which are intersected by transverse apertures 15.

Double flat expansion springs 16 are interposed between the inner ends of each pair of opposed plungers to actuate them outwardly. Each spring device 16 consists of two identical rectangular steel spring plates 17, the ends of which are straight and longitudinally alined while their intermediate portions are laterally bowed or arcuate in shape. A pair of such spring plates with their bowed portions extending in opposite directions and their flat ends in contact, are placed between two opposed plungers, the notches or slots 14 of the latter snugly receiving the straight flat ends of the spring plates. Cotter pins or the like 18 are passed through the apertures 15 and alined apertures in the ends of the spring to securely and rigidly connect the ends of the double spring to opposed plungers.

The advantages of the new construction are numerous. By making all of the springs 17 of the same size, weight and tension or strength and using a pair of such springs between opposed plungers in the manner shown, a more balanced and efficient structure is provided. The double springs connected to the opposed plungers will cause the plungers to be thrust in true radial directions to reduce wear and produce an even and positive pressure of the ring sections on the cylinder wall, thus tending to keep the piston more perfectly centered within the cylinder wall to increase the efficiency of the motor and afford the minimum consumption of fuel. The efficiency of the motor is also increased by the improved construction since the use of the double springs with the shown arrangement of plungers and connecting rod pin bearings, cause an even distribution of weight around the piston. The opposite bowing of the double springs allows ample clearance for the connecting rod. The construction of the piston permits it to be die-cast and plunger and spring connection affords a more economical means of assembling the parts.

It will be understood that changes in the form, proportion and arrangement of parts may be made within the spirit and scope of the appended claims.

What is claimed is:

1. In a piston construction, the combination with a hollow piston provided with a packing ring groove in its outer wall and hollow bosses extending inwardly from its inner wall, said bosses being diametrically disposed and communicating with said groove, a sectional packing ring in said groove, and plungers disposed in said bosses and connected to the sections of said ring, of a pair of flat expansion springs each having a bowed or arcuate intermediate portion and flat ends longitudinally alined, said springs being positioned in opposed relation between the inner ends of said plungers with their arcuate portions bowed in opposite directions, and means for securing the ends of said springs to said plungers.

2. In a piston construction, the combination with a hollow piston provided with a packing ring groove in its outer wall and hollow bosses extending inwardly from its inner wall, said bosses being diametrically disposed and communicating with said groove, a sectional packing ring in said groove, and plungers disposed in said bosses and connected to the sections of said ring, the inner ends of said plungers projecting beyond the inner ends of said bosses and formed with longitudinally extending slits intersected by transverse apertures, of a pair of flat expansion springs, each having a bowed or arcuate intermediate portion and flat apertured ends longitudinally alined, said springs being positioned in opposed relation with their arcuate portions bowed in opposite directions and their flat ends in contact and disposed in the slits in said plungers, and fastening pins passing through the apertures in said plungers and springs.

3. In a piston construction, the combination of a hollow piston provided in its outer wall with two longitudinally spaced packing ring grooves and on its inner wall with diametrically opposed bearings for the usual connecting rod pin and with a pair of hollow inwardly extending bosses communicating with each of said grooves, the bosses of each pair being diametrically opposed and the bosses of one pair being positioned at right angles to the bosses of the other pair, all of said bosses being positioned at equal distances from a plane intersecting the axis of said bearings and extending longitudinally of the piston, a packing ring in each of said grooves composed of two substantially semi-circular sections, a plunger in each of said bosses, the plungers in each pair of opposed bosses being connected with the centers of the ring sections in the groove with which such pair of bosses communicate, and a pair of flat expansion springs interposed between the inner ends of the plungers in each pair of opposed bosses to actuate said plungers outwardly, the springs of each pair having oppositely bowed intermediate portions, and all of said springs being of the same size, weight and tension for the purposes set forth.

SUSAN V. SULLIVAN,
Administratrix of the Estate of Michael H. Sullivan, Deceased.